United States Patent [19]

Otsuka et al.

[11] Patent Number: 4,852,791
[45] Date of Patent: Aug. 1, 1989

[54] METHOD FOR MAKING CORROSION RESISTANCE HEAT EXCHANGERS

[75] Inventors: Tatsuo Otsuka; Ichiro Iwai, both of Oyamashi; Noboru Yamaguchi, Ashikagashi, all of Japan

[73] Assignee: Showa Aluminum Kabushiki Kaisha, Osaka, Japan

[21] Appl. No.: 201,188

[22] Filed: Jun. 2, 1988

Related U.S. Application Data

[62] Division of Ser. No. 91,992, Sep. 2, 1987, abandoned.

[30] Foreign Application Priority Data

Sep. 4, 1986 [JP] Japan ................ 61-209154

[51] Int. Cl.$^4$ .......................... B23K 1/12; B23K 1/19; F28D 19/06; F28D 21/00
[52] U.S. Cl. ................................ 228/183; 228/209; 228/223; 228/254; 228/263.17; 228/226; 204/33; 204/37.1; 204/38.4
[58] Field of Search .............. 228/183, 189, 208, 209, 228/254, 219, 223, 226, 263.17; 29/DIG. 12; 204/37.1, 33, 38.4

[56] References Cited

U.S. PATENT DOCUMENTS

| | | | |
|---|---|---|---|
| 2,511,952 | 6/1950 | Stareck et al. ...................... | 204/38.4 |
| 2,676,916 | 4/1954 | Zelley ................................. | 204/38.4 |
| 2,730,490 | 1/1956 | Hendrich et al. .................. | 204/38.4 |
| 3,061,527 | 10/1962 | Karner et al. ....................... | 228/209 |
| 3,193,475 | 7/1965 | Kenedi et al. ........................ | 204/38.4 |
| 3,235,404 | 2/1966 | Mickelson et al. ................. | 204/38.4 |
| 3,909,209 | 9/1975 | Kruper et al. ...................... | 228/209 |
| 3,951,328 | 4/1976 | Wallace et al. ..................... | 228/207 |
| 4,104,134 | 8/1978 | Roberts et al. ..................... | 204/37.1 |
| 4,645,119 | 2/1987 | Haramaki et al. .................. | 228/183 |
| 4,705,206 | 11/1987 | Kamiya et al. ..................... | 228/183 |

FOREIGN PATENT DOCUMENTS

| | | | |
|---|---|---|---|
| 168958 | 12/1981 | Japan ................. | 228/183 |
| 202996 | 11/1983 | Japan ................. | 228/183 |
| 229280 | 12/1984 | Japan ................. | 228/183 |
| 21176 | 2/1985 | Japan ................. | 228/183 |
| 186164 | 8/1986 | Japan ................. | 228/183 |

Primary Examiner—Nicholas P. Godici
Assistant Examiner—Samuel M. Heinrich

[57] ABSTRACT

A method for producing corrosion resistance heat exchangers having a plurality of aluminum tubular elements and fin members, the method comprising immersing the tubular elements in a bath with passing an electric current so that the surfaces thereof are covered with zinc layers of 0.3 μm or more in thickness; combining the zinc plated tubular elements with fin members covered with a brazing sheet so that a core is provisionally formed; painting the provisional core with a noncorrosive flux; and placing the provisional core in a furnace to braze the fin members to the tubular elements, and also to enable the zinc layers to diffuse over the surfaces of the tubular elements.

3 Claims, 1 Drawing Sheet

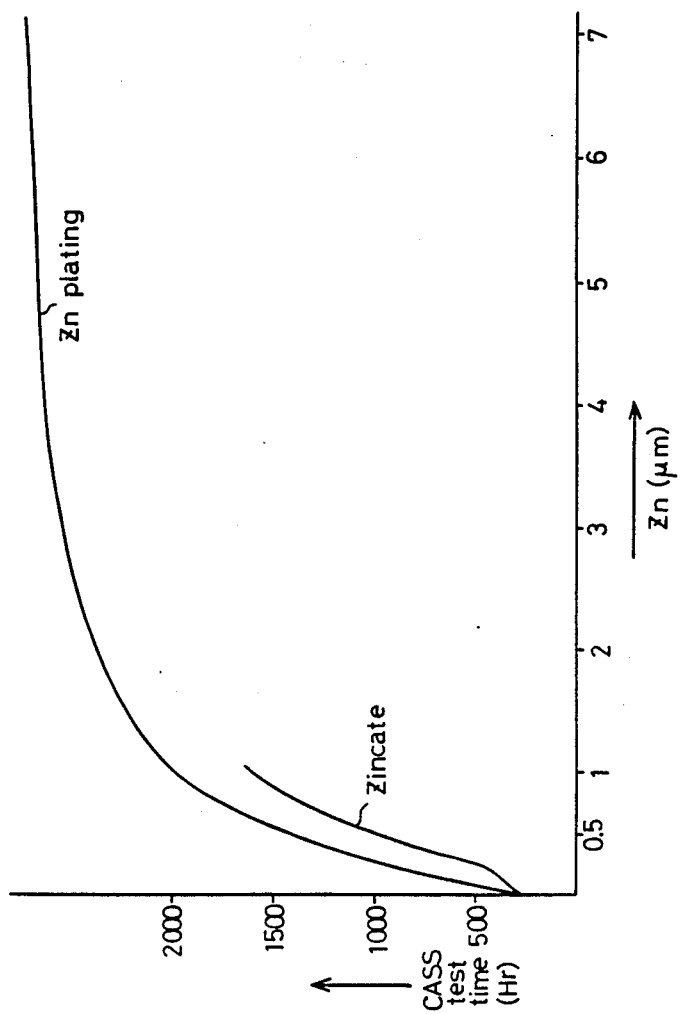

METHOD FOR MAKING CORROSION RESISTANCE HEAT EXCHANGERS

RELATED APPLICATION

This application is a division of our co-pending application entitled A Method for Making Corrosion Resistance Heat Exchangers, Ser. No. 091,992, filed Sept. 2, 1987, now abandoned.

BACKGROUND OF THE INVENTION

1. Field of the Invention

The present invention relates to a heat exchanger used for automobile air-conditioners, and for oil coolers for industrial use, and more particularly to a heat exchanger for such use having a core which includes tubular elements for allowing a coolant to pass, and fin members joined thereto. Hereinafter the term "aluminum" includes aluminum-base alloys unless specified to the contrary.

2. Description of the Prior Art

There are many types of heat exchangers of aluminum used for the above-mentioned applications, which have a plurality of aluminum tubes, and fins provided in spaces between one tube and the next. To facilitate the joint between the tubes and fins, recently a brazing sheet method has been introduced. Under this method the fins are previously covered with a brazing sheet, thereby enabling them to be thermally joined to the tubes in a furnace at one time.

The heat exchangers used for the abovementioned applications must be resistant to corrosion, otherwise leakage would occur through a corroded part.

To achieve the ability of corrosion resistance, the tubes or fins or both are made of different types of aluminum selected so that even if corrosion occurs on the fins it precedes the corrosion on the part of tubes, thereby protecting the tubes against earlier corrosion. Another practice is to use a non-corrosive flux, such as fluorides, which leaves no corrosive residue after the fins are brazed to the tubes.

The most common practice is to cover the surfaces of the tubes with zinc before hand, and diffuse the zinc over the surfaces thereof by heat. To cover the surfaces of the tubes with zinc, the common practice is to immerse the tubes in a zincate solution, which contains 50 to 150g/l and 200 to 400g/l of NaOH. Hereinafter this practice will be referred to as the zincate process.

However the corrosion resistance achieved by the zincate process is unstable. In general, sufficient corrosion resistance results from a relatively high concentration of zinc in the top layer such as 1 to 5% by weight. The high concentration is achieved by applying a thickness of 0.3 $\mu$m or more, most safety a level of thickness of 1 $\mu$m. However the zincate process cannot produce zinc layers having such thicknesses; if the working temperature is raised, the thickness of zinc layers will increase but is likely to become uneven. A thin part is liable to breakage and early corrosion.

OBJECTS AND SUMMARY OF THE INVENTION

The present invention aims at solving the problems pointed out with respect to the corrosion resistant heat exchangers produced under the zincate process, and has for its object to provide a method for producing heat exchangers having a high ability of corrosion resistance.

Other objects and advantages of the present invention will become more apparent from the following detailed description, when taken in conjunction with the accompanying drawing which shows, for the purpose of illustration only, one embodiment in accordance with the present invention.

According to the present invention there is provided a method for producing corrosion resistant heat exchangers having a plurality of aluminum tubular elements and fin members, the method comprising:

immersing the tubular elements in a bath
with passing an electric current so that
the surfaces thereof are covered with zinc layers of 0.3 $\mu$m or more in thickness;

combining the zinc-plated tubular elements with fin members having a brazing sheet so that a core is provisionally formed; and placing the provisional core in a furnace to enable the fin members to braze to the tubular elements, and also to enable the zinc layers to diffuse over the surfaces of the tubular elements, wherein the provisional core is coated with a noncorrosive flux prior to the brazing treatment.

To pass a coolant through, tubes of aluminum are used. The tubes are immersed in a bath, and covered with zinc layers of a desired thickness by electroplating. Before they are immersed in the bath it is preferred that they are immersed in the same bath or another one containing the same composition, without passing an electric current. Hereinafter this pretreatment will be referred to as the pre-zincate treatment. Owing to this pretreatment the tubes are covered with thin zinc layers. The foundation layers strengthen the bond between the upper zinc layers and the tubes.

The pre-zincate treatment can be carried out before or after the tubes are bent into desired shapes, such as a zigzag form.

The bent zinc-plated tubes are combined with fins of aluminum, which are covered with a brazing sheet. After the fins are coated with a flux, the tubes and fins are placed in a furnace, and brazed to each other by heat, wherein the flux contains non-corrosive substance; for example, a fluoride agent disclosed in U.S. Pat. No. 3,951,328. According to the disclosure of this prior patent the fluoride agent consists essentially of potassium fluoaluminate complexes and is essentially free of unreacted potassium fluoride. Such noncorrosive agents leave no corrosive residue, thereby maintaining the non-corrosive ability.

BRIEF DESCRIPTION OF THE DRAWING

FIG. 1 is graphs showing the corrosion resistance achieved by the present invention and by the conventional zincate process.

DETAILED DESCRIPTION OF THE PREFERRED EMBODIMENT

Reference will be made to a typical example of heat exchanger which has a plurality of bent tubes and corrugated fins. The tubes are first subjected to a pre-zincate treatment and then to a zinc electroplating process. The zinc-plated tubes are combined with corrugated fins into a core; however, at this stage they are provisionally assembled. In this specification the core in this state will be referred to as the provisional core. Each of the processes will be described in greater detail below:

(Pre-zincate treatment)

To achieve a wide diffusion of the zinc layers it is necessary to impart to the individual tubes as large potential difference as possible. To this end it is preferable that the potential of the tubes is kept "base". To achieve it, elements which tend to keep the tubes "noble" should be avoided or minimized in constructing them. It is preferred to use pure aluminum such as A1000 type. Pure aluminum is also conducive to smooth extrusion when the tubes are extruded through an extruding machine. The contents of copper and manganese which tend to keep the tubes "noble" should be limited to 0.04% or less. If the contents of these elements exceed 0.04% the ability of corrosion resistance will decrease.

The pre-zincate treatment is applied as the first step. First, the surfaces of the tubes are cleaned in the known manner, and then immersed in a pre-zincate bath, without passing an electric current for an optional period of time. This bath contains the same composition as that of an electroplating bath which will be referred to below. The concentration of ZnO and NaOH are relatively low as compared with those under the conventional zincate process. The composition of the bath is as follows:

ZnO: 5 to 15g/l
NaOH: 50 to 150g/
lustering agent: 3 to 10 10ml/l

The lustering agent is intended to stabilize the bath, and equalize the resulting zinc layers, for which amino aldehyde and heliotropine can be used.

In the pre-zincate treatment it is necessary to immerse the tubes in the pre-zincate bath for at least 5 seconds. If it is less than 5 seconds, sufficient foundation layers will not be formed but oxide films will remain on the surfaces of the tubes, which are likely to prevent the formation of widespread zinc layers in the subsequent electroplating. However, if the immersion lasts too long, it will result in the waste of time because the thickness of the layers does not increase beyond a certain limit. The optimum period of time is 15 to 90 seconds.

The temperature of the bath is adjusted in the range of 20° to 35° C. If it is less than 20° C., the pretreatment will take too long, whereas if it exceeds 35° C., the lustering agent is likely to decompose, thereby resulting in an unstable bath and producing uneven zinc layers. Most preferably the temperature is in the range of 25° to 30° C.

(Electroplating Process)

The bath used in the electroplating process has the same composition as that of the prezincate bath. The temperature is also the same. While the tubes are immersed in the electroplating bath an electric current is passed. As a result thicker and more even zinc layers are formed on the foundation layers formed by the pre-zincate treatment. It is necessary to form the layers having a thickness of at least 0.3 $\mu$m. If it is less than 0.3 $\mu$m the concentration of zinc diffusion layers will be too low to prevent the negative charge corrosion. However if it exceeds 8 $\mu$m their thickness is likely to cause a different problem; for example, the layers are likely to fall off, thereby weakening the bond between the zinc layers and the tubes.

FIG. 1 shows the comparative data about the ability of corrosion resistance between when the tubes are covered with zinc layers formed by the method of the present invention and by the conventional zincate process. The X axis shows the thickness of the zinc layers, and the Y-axis shows how the degree of corrosion varies with time. The data was obtained by a CASS test (corrosion accelarating test), which will be referred to below with reference to examples. It is evident from the graphs that tubes covered with zinc layers under the present invention exhibit a higher ability of corrosion resistance over those treated under the conventional zincate process. This superiority presumably derives from finer crystalline structure of the zinc layers.

Table 1 shows that in order to achieve the corrosion resistance capable of lasting for 1000 hours or more, it is necessary for the zinc layers to have a thickness of at least 0.3 $\mu$m. Desirably, the corrosion resistance should last at least for 1500 hours, and in that case a thickness of 0.5 $\mu$m or more will be required. When the corrosion resistance over 2000 hours is needed, the thickness must be at least 1.0 $\mu$m. However even if the thickness exceeds 3.0 $\mu$m the ability of corrosion resistance will not increase. After all, the optimum range of thickness is 0.3 to 8.0 $\mu$m; especially, 0.5 to 5.0 $\mu$m. More preferably, it is 1.0 to 3.0 $\mu$m. The thickness of zinc layers is controlled by varying the current density and the time spent in the electroplating. The thickness herein includes the thickness of the foundation layers formed by the pre-zincate treatment.

(Brazing and zinc diffusion treatment)

The tube covered with the foundation zinc layer having a desired thickness is worked into a desired shape, such as a zigzag form, and combined with a fin, which is made up of a core plate of Al-Mn-Zn alloy clad in a covering of Al-Si-Zn, that is, a brazing agent.

The corrugated fins are placed between the bent tubes so as to form a provisional core, wherein the "provisional" means a state at which the tubes and fins are not permanently joined to each other. The provisional core is painted with a flux, and heated in a furnace filled with an inert gas, such as $N_2$ gas, so as to braze the fins to the tubes. By the same heat the electroplated zinc layers on the surfaces of the tubes are diffused into the crystalline structure of the aluminum, thus forming the zinc diffusion layers on the surface of the tubes.

The flux is selected from the substances which contains non-corrosive agent, such as fluoride. For example, potassium fluoaluminate complexes which consists essentially of $AlF_3$ and KF at the ratio of 65:35 to 45:55 by weight can be used. An example of this type of flux is disclosed in U.S. Pat. No. 3,951,328, and as generally known in the art, they are advantageous in that the residue is non-corrosive and non-hygroscopic. If a flux of chloride is used a cleaning process will be required to remove any flux residue.

To form the zinc diffusion layer a temperature normally required for electroplating will suffice. The zinc layers spread in the range of 30 to 300 $\mu$m, having a concentration of 1 to 5% by weight. If the concentration is less than 1% by weight, and the range of spread is around 30 $\mu$m, an expected ability of corrosion resistance will not be reached. However if the concentration exceeds 5% by weight and the range of spread exceeds 300 $\mu$m, the zinc layer per se is liable to corrosion, and cannot protect the tube against corrosion. The optimum range of spread is 130 to 200 $\mu$m. The concentration of zinc and the range of spread are controlled by adjusting the working temperatures and time spent in the treatment. The brazing is carried out at about 600° C. for 5 to 15 minutes. It is also possible to preheat the tubes and fins at about 450° C. or more so as to achieve the diffusion of zinc layers beforehand.

As is evident from the foregoing description, the zinc layer is formed on the surface of the tube by zinc electroplating in a bath consisting essentially of ZnO and NaOH with the addition of a lustering agent. This method is more advantageous than the conventional zincate process in that a greater quantity of zinc evenly and tightly adheres to the surface of the tube in the form of diffusion layers, thereby ensuring that the ability of corrosion resistance lasts longer than the tubes are used for a heat exchanger.

EXAMPLE 1

Extruded flat tubes were used, which were made of A1050 type alloy, each having a thickness of 0.6 mm and a width of 22 mm. They were electroplated in the following manner:

The electroplating time was varied from tube to tube so as to form zinc layers having different thicknesses ranging from 0.4 to 3.0 μm.

The composition of the bath:
ZnO: 15g/l
NaOH: 130g/l
helitropine: 15ml/l

The conditions for electroplating
Temperature of the bath: 25° C.
Current density 1.5A/dm$^2$ Then the tubes having different thicknesses of zinc layers were individually bent in a zigzag form, and combined with corrugated fins. Each fin, having a thickness of 0.16mm, was made up of a core plate of A3003 type aluminum alloy and a covering of 4045 type aluminum alloy at a coverage ratio of 12% on both surfaces of the fin. In this way a provisional core was assembled. This provisional core was immersed in a 10% suspension of a flux of fluoride so as to cover it with the flux. Then the brazing was effected at a furnace filled with N$_2$ gas at 600° C. for 5 minutes. Four heat exchangers Nos. 1 to 4 were produced.

For comparison the tubes of the same type mentioned above were treated under the conventional zincate process to form a zinc layer having a thickness of 0.4 μm on the surfaces thereof, and combined with fins of the same type as those referred to above. The tubes and fins were brazed to each other to obtain a heat exchanger No. 5.

Table 1 shows comparative data between the heat exchangers Nos. 1 to 4 for the present invention and No. 5 for the conventional methods.

The CASS tests (corrosion accelerating test) were conducted in accordance with the JIS (Japanese Industrial Standard), H8186, so as to measure the time up to when a hole due to corrosion occurred.

TABLE 1

| HE No. | Thickness (μm) | Concentration of Zn after brazing (%) | Time (hour) |
| --- | --- | --- | --- |
| No. 1 | 0.4 | 1.3 | 1000 or more |
| No. 2 | 1.0 | 1.9 | 1500 or more |
| No. 3 | 1.4 | 2.4 | 2000 or more |
| No. 4 | 3.0 | 4.2 | 2000 or more |
| No. 5 | 0.4 | 1.2 | 800 or less |

(Note) HE stands for heat exchanger.

The Time means a time up to when a hole due to corrosion occurred.

Table 1 shows that irrespective of the same thickness of zinc layers, the heat exchangers Nos. 1 to 4 produced under the present invention exhibit a higher ability of corrosion resistance over the heat exchanger No. 5 produced under the conventional zincate process. It will be further appreciated from the CASS tests that under the present invention the ability of corrosion resistance can be increased to such an extent as to last over 2000 hours, which is due to the feasibility of the present invention that zinc layers having a thickness of 1.0 μm or more are formed on the surface of the tube.

EXAMPLE 2

In this example the tubes were subjected to pre-zincate treatment prior to the zinc electroplating.

Flat, hollow tubes of A1050 alloy were used which were 0.7mm thick. Their surfaces were cleaned in the known manner, and then subjected to pre-zincate treatment; that is, the tubes were immersed in a bath having the following composition, without passing an electric current for a fixed period of time. The details of the treatment are as follows:

The composition of the bath:
NaOH: 90g/l
ZnO: 10g/l
amino aldehyde: 5ml/l

While the tubes were immersed in the bath an electric current was passed to effect the electroplating, wherein the current density and the time spent are shown in Table 2.

After the zinc layers were formed on the tubes the thickness of each tube was measured, the results of which are shown in Table 2. The adherence of each layer to the tube was examined by bending each tube in a zigzag form and visually inspecting any fissure on the surface of the layer. No fissure was recognized with the naked eye.

The bent tubes were combined with fins of the same type as those used in Example 1. The provisional core was heated in a furnace filled with N$_2$ gas for 15 minutes. In this way the tubes and fins were brazed to each other. At the same heat the zinc layers were diffused over the surfaces of the individual tubes. The extent of diffusion and the ability of corrosion resistance were examined, and shown in Table 2:

TABLE 2

| HE No. | Formation of Zn Layers | |
| --- | --- | --- |
| | Pre-Zincate | Electroplating |
| 6 | 25° C. × 30 sec | 0.8 A/dm$^2$ × 10 min |
| 7 | 27° C. × 20 sec | 1.0 A/dm$^2$ × 10 min |
| 8 | 30° C. × 5 sec | 1.5 A/dm$^2$ × 10 min |
| 9 | 30° C. × 60 sec | 2.5 A/dm$^2$ × 10 min |
| 10 | 25° C. × 90 sec | 3.0 A/dm$^2$ × 10 min |
| 11 | 27° C. × 90 sec | 5.0 A/dm$^2$ × 10 min |

| | Thickness (μm) | Range of Diffusion after brazing (μm) | Time (hour) |
| --- | --- | --- | --- |
| 6 | 0.8 | 100 | 1500 or more |
| 7 | 1.0 | 130 | 2000 or more |
| 8 | 1.5 | 140 | 2000 or more |
| 9 | 2.5 | 180 | 2000 or more |
| 10 | 3.0 | 200 | 2000 or more |
| 11 | 5.0 | 250 | 2000 or more |

(Note) HE stands for heat exchangers.

The Time means a time until a hole due to corrosion occurred.

It will be understood from Table 2 that the heat exchangers produced under the present invention have a high ability of corrosion resistance because of forming relatively thick zinc layers on the surfaces of the tubes. The CASS tests show that when the layer having a thickness of 1 μm or more is formed, the ability of corrosion resistance lasts over 2000 hours.

For comparison a zinc layer having a thickness of 1 μm was formed on the tube, and diffused under the conventional zincate process. The CASS test conducted on this tube showed that a hole due to corrosion occurred in 1500 hours. It will be appreciated from the comparison that the tubes treated under the present invention have a higher ability of corrosion resistance.

What is claimed is:

1. A method for producing corrosion resistant heat exchangers having a plurality of aluminum tubular elements and fin members, the method comprising: immersing the tubular elements in a first bath for a period of time between 15 and 90 seconds, without passing an electric current, to form foundation layers on the surfaces of the elements; immersing the tubular elements in a second bath and passing an electric current so that the surfaces of the elements are covered with zinc layers, the thickness of said layers being in the range of 1.0 to 3.0 $\mu$m; said first and second baths containing 5 to 15 g/l of ZnO, 50 to 150 g/l of NaOH and 3 to 10 ml/l of a lustering agent, and being kept at a temperature of 20° to 35° C.; combining the zinc plated tubular elements with fin members covered with a brazing sheet so that a core is provisionally formed; and placing the provisional core in a furnace to braze the fin members to the tubular elements, and also to enable the electroplated zinc layers to diffuse over the surfaces of the tubular elements.

2. A method as defined in claim 1, wherein the brazed joint between the fin members and the tubular elements ia made with the use of non-corrosive flux which comprises $AlF_3$ and KF complexes in the eutectic crystalline structure or at least in the neighborhood thereof.

3. A method as defined in claim 1, wherein the furnace is filled with an inert gas.

* * * * *

UNITED STATES PATENT AND TRADEMARK OFFICE
CERTIFICATE OF CORRECTION

PATENT NO. : 4,852,791

DATED : August 1, 1989

INVENTOR(S) : Tatsuo Otsuka et al

It is certified that error appears in the above-identified patent and that said Letters Patent is hereby corrected as shown below:

Col. 8, line 12 change "ia" to --is--.

Signed and Sealed this

Fifteenth Day of May, 1990

Attest:

HARRY F. MANBECK, JR.

Attesting Officer      Commissioner of Patents and Trademarks